Sept. 30, 1952        H. E. KALTER        2,612,206

SUPPORTING TRUSS MEMBERS FOR CYCLE SADDLES

Filed March 12, 1949

INVENTOR.
Harvel E. Kalter
BY
Slough & Slough

Patented Sept. 30, 1952

2,612,206

UNITED STATES PATENT OFFICE 2,612,206

SUPPORTING TRUSS MEMBERS FOR CYCLE SADDLES

Harold E. Kalter, Elyria, Ohio, assignor to The Troxel Manufacturing Company, Elyria, Ohio, a corporation of Ohio Application March 12, 1949, Serial No. 81,129

3 Claims. (Cl. 155—5.22)

My invention relates to cycle saddles and relates more particularly to improvements in the saddle supporting truss or reach members for such saddle.

The principal object of my invention resides in the combination of improved truss or reach supporting saddle and cantle dependent spring members.

It is an object of my invention to so form the truss assembly or the reach assembly of my invention that any lifting effect imparted to rearwardly disposed springs and interconnecting truss connected means, of the type set forth and described and claimed in my co-pending application for United States Letters Patent Ser. No. 60,564, filed November 17, 1948, may be restrained, controlled and/or limited in action.

Another object of my invention is to provide improved truss or reach members which may be easily assembled for shipping and which, when a plurality of the same are so assembled, will occupy a relatively smaller space than required for previously constructed truss or reach assemblies.

Another object of my invention is to provide improved truss or reach members which will be durable in use, highly efficient in operation and inexpensive to manufacture.

Other objects of my invention and the invention itself will become more readily apparent to those skilled in the art to which my invention appertains, reference being made to the following description taken in connection with the accompanying drawings, in which drawings.

Figure 1:
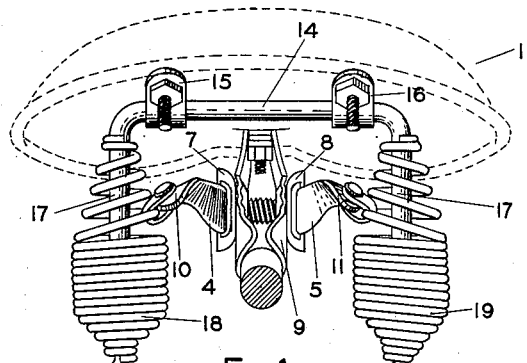
Fig. 1 is a rear elevational view of a cycle saddle embodying the improved truss or reach assembly of my invention, said view being tilted slightly forwardly and upwardly to permit a greater illustration of the parts and the saddle being shown in dotted lines to facilitate a better showing of said parts.

Referring now to the drawings in all of which like parts are designated by like reference characters, at 1 I have illustrated a saddle which may be the usual leather covered metal frame having a pommel end portion 2 and cantle end portion 3. A pair of truss like reach members 4 and 5 which form the essential part of the present invention are secured at the pommel end of the saddle to the frame by means of clips 6 in a manner well known in the art. Said reach members are preferably generally longitudinally disposed, laterally spaced flat members converging generally at their more generally forwardly disposed pommel end portions and disposed in generally parallel relation to each other adjacent their midportions, clamp means 7 and 9 being associated therewith for the purpose of securing the saddle post member P thereto. Said members generally tend to diverge at their more rearward cantle end portions, as shown in my co-pending application hereinbefore referred to. Said rearward free end portions of the reach members are provided with generally slightly downwardly and inwardly flared ends 10 and 11, which end portions are apertured as shown at 13 for purposes later to be described herein.

At $x$ rearward portions of the flat reach members are generally bent outwardly from the planes of the parallel mid-portions thereof and at $y$ each strap is preferably bent back upon itself on a diagonal slant to the said previously referred to parallel portions. Disposed just rearwardly of said bend $y$ and intermediate said bend $y$ and the aperture 13 disposed in the free end of each said strap or reach member, a generally V-shaped notch $z$ is disposed in the lowermost side of each said reach member, the apex $a$ of said V-shaped notch being positioned preferably in line with or immediately below the center axis of the aperture 13 in said reach member.

As described in my co-pending application, previously referred to herein, at the rear or cantle end of the saddle, a U-shaped yoke 14 is secured, as by clips 15 and 16, thereto, downwardly depending legs 17 thereof carrying spiral aligned saddle supporting springs 18 and 19.

A pair of generally U-shaped loops 20 apertured as at 21 are telescoped over an intermediate coil of each of the springs 18 and 19 and said apertures 21 are aligned with an aperture 13 of each reach member, a brad 12 or the like projecting through the aligned apertures 21, 13, 21 wherefor the loops are loosely telescoped over the convolutions and secured to the reach members, and a certain amount of reciprocatory movement is thus permitted.

Figure 3:
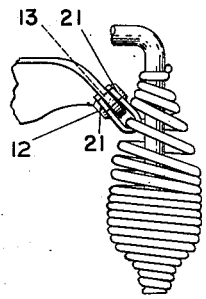
Fig. 3 is a fragmentary view illustrating one of the springs with a portion of the reach member, said spring and associated parts being shown under pressure in contrast to the non-operative position shown in Figs. 1 and 2.
Figure 2:
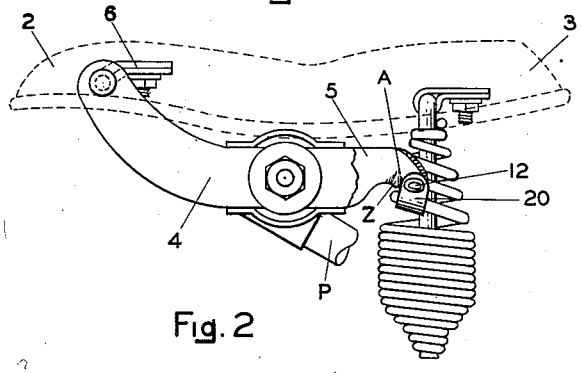
Fig. 2 is a side elevational view of the saddle of Fig. 1, the saddle being shown in dotted lines similar to the showing in Fig. 1, and the more forwardly disposed reach member, connecting means and spring member, the term forwardly and/or rearwardly being used in this connection to describe the parts as they appear to one viewing the drawing.
Figure 4:
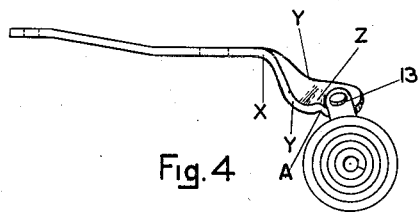
Fig. 4 is a perspective view of one of the reach or truss members of Figs. 1 to 3 inclusive and the connecting means and springs.

When weight is placed on the saddle as best shown in Fig. 3, each loop exerts a lifting effect upon the surfaces of the spring with which each is associated and tends to draw up the inner convolution of the spring, expanding the same, and the loop 20 has a tendency to ride laterally and forwardly on the convolution. The provision of the V-shaped notch z on the inner side of each reach member forwardly of the pivoted connection between each loop and its associated reach member stops such lateral movement and limits the movement of said loops.

Figure 5:
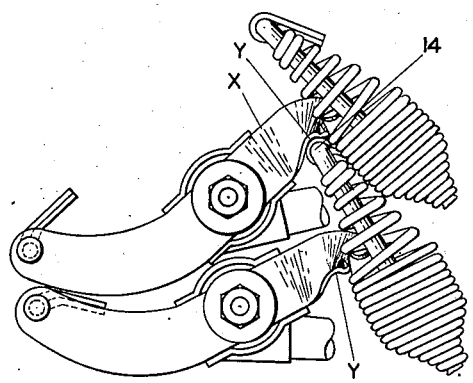
Fig. 5 is a side elevational view showing a pair of reach assemblies in an assembled relation as for shipping, etc.

Further such notches are useful in packing a plurality of reach assemblies for shipping, as illustrated in Fig. 5. The yoke 14 of the depending spring supporting cantle secured member is adapted to rest just forwardly of each V-shaped member and to be seated in the bend y of the uppermost reach member.

Although I have illustrated my invention in connection with certain preferred embodiments thereof, I am aware that my invention is susceptible of certain departures and size, etc., without, however, departing from the spirit of my invention and the scope of the appended claims.

I claim:

1. In a saddle construction, reach members having rearwardly extending end portions, a pair of spring members secured to the cantle portion of the said saddle, a pair of loop members, each loop member having an eye portion and a pair of planular elongated overlapped portions, each loop member adapted to be secured to a separate end of the reach member and having its eye portion embracing a portion of each spring member, the rearwardly extending end portions of said reach member having a generally V-shaped notch disposed therein, whereby each of the said loop members is limited in its forward movement.

2. In a saddle construction, a pair of reach members, said reach members being provided with a pair of outwardly diverging cantle end portions, said end portions being apertured, a pair of rearwardly disposed compression spring members, a pair of loop members, each provided with an eye portion and a pair of lapping apertured portions, each of said apertured end portions of the reach members being inserted within the lapped portions of one of the loop members, said apertures of said reach members and said loop members being aligned, securing means disposed through said aligned apertures and securing said loops and said reach members together, the eye of each said loop loosely embracing a medial convolution of each said compression spring, stop means disposed immediately forwardly of the connection between said reach members and said loop members, whereby each of said loop members is limited in its forward movement.

3. In a saddle construction, a reach construction, said reach construction comprising a pair of rearwardly extending generally diverging members, said rearwardly disposed members each having an abruptly inwardly flared end, said end being apertured, a pair of coiled compression springs, a generally U-shaped spring support, said support having a yoke secured to the rear of said saddle and downwardly extending legs, each said compression spring being telescoped about and anchored to one of said support legs, a pair of loop members each comprising an eye portion and a pair of planular apertured extensions, the eye of each said loop member loosely embracing a medial portion of an opposite compression spring, the extensions of each said loop member being disposed on opposite sides of a different apertured end of the reach construction, the apertures of said associated extensions reach ends being aligned, means securing said reach ends and said loop members, said loop members adapted to have oscillatable movement about said securing means, stop means adapted to limit the forward movement of each of said loop members upon its connected reach member.

HAROLD E. KALTER.

REFERENCES CITED

The following references are of record in the file of this patent:

UNITED STATES PATENTS

| Number | Name | Date |
| --- | --- | --- |
| 2,080,658 | Duffy | May 18, 1937 |
| 2,318,246 | Mesinger | May 4, 1943 |
| 2,341,720 | Kalter | Feb. 15, 1944 |

FOREIGN PATENTS

| Number | Country | Date |
| --- | --- | --- |
| 25,114 | Great Britain | Nov. 11, 1911 |
| 300,025 | Great Britain | Nov. 28, 1928 |